United States Patent
Jokura (10) Patent No.: US 8,074,048 B2
(45) Date of Patent: Dec. 6, 2011

(54) DATA STORAGE DEVICE

(75) Inventor: Akiko Jokura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 561 days.

(21) Appl. No.: 12/318,154

(22) Filed: Dec. 22, 2008

(65) Prior Publication Data

US 2009/0172347 A1 Jul. 2, 2009

(30) Foreign Application Priority Data

Dec. 26, 2007 (JP) .................................. 2007-334548

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. ......... 711/209; 711/159; 711/166; 711/210
(58) Field of Classification Search .................. 711/154, 711/159, 166, 209–221
See application file for complete search history.

(56) References Cited

U.S. PATENT DOCUMENTS

| | | | |
|---|---|---|---|
| 2004/0054866 A1* | 3/2004 | Blumenau et al. | 711/202 |
| 2004/0260870 A1* | 12/2004 | Factor et al. | 711/112 |
| 2005/0172005 A1* | 8/2005 | Goodwin | 709/211 |
| 2008/0133865 A1* | 6/2008 | Qi et al. | 711/170 |
| 2008/0209158 A1* | 8/2008 | Asano et al. | 711/173 |

FOREIGN PATENT DOCUMENTS

| | | |
|---|---|---|
| JP | 2001-249769 | 9/2001 |
| JP | 2007-102512 | 4/2007 |

* cited by examiner

Primary Examiner — Jared Rutz
Assistant Examiner — Ryan Bertram
(74) Attorney, Agent, or Firm — Staas & Halsey LLP

(57) ABSTRACT

A storage device includes a memory for storing data in a plurality of logical volumes; a controlling unit for controlling an access to data in accordance with a process comprising the steps of: generating mapping information indicative of a correspondence between logical volume information and recognition information; generating a pseudo logical volume and pseudo logical volume information associated with the pseudo logical volume, the pseudo logical volume being another of the logical volumes; and upon receipt of a command for canceling an assignment of one of the logical volumes to the corresponding recognition information, modifying the mapping information so that recognition information that has been indicative of said one of the logical volumes becomes indicative of the pseudo logical volume information associated with the pseudo logical volume.

14 Claims, 11 Drawing Sheets

Fig. 1

Fig. 2A
LV MANAGEMENT TABLE

| LV No. | CAPACITY(B) |
|---|---|
| 100 | 100G |
| 101 | 800G |
| | |
| 110 | 900G |
| 111 | 500G |
| 112 | 900G |
| 113 | 200G |
| 114 | 100G |
| 115 | 500G |
| dummy_LV_101 | nM |

Fig. 2B
ZONE MANAGEMENT TABLE

| Zone#1 | | | |
|---|---|---|---|
| LUN | LV | AUXILIARY MARK | ERROR RECORD |
| 0 | 100 | OFF | OFF |
| 1 | 101 | OFF | OFF |
| 2 | 110 | OFF | OFF |
| 3 | 111 | OFF | OFF |
| 4 | 112 | OFF | OFF |

Fig. 2C

| Zone#2 | | | |
|---|---|---|---|
| LUN | LV | AUXILIARY MARK | ERROR RECORD |
| 0 | 114 | OFF | OFF |
| 1 | 115 | OFF | OFF |
| 2 | | OFF | OFF |

Fig. 3A

| LUN | Zone#1 LV (CAPACITY) | DEVICE NAME |
|---|---|---|
| 0 | 100(100G) | /sda |
| 1 | 101(800G) | /sdb |
| 2 | 110(900G) | /sdc |
| 3 | 111(500G) | /sdd |
| 4 | 112(900G) | /sde |

Fig. 3B

| LUN | Zone#1 LV (CAPACITY) | DEVICE NAME |
|---|---|---|
| 0 | 100(100G) | /sda |
| 1 | 101(800G)←DELETE | /sdb |
| 2 | 110(900G) | /sdc |
| 3 | 111(500G) | /sdd |
| 4 | 112(900G) | /sde |

Fig. 3C

| LUN | Zone#1 LV (CAPACITY) | DEVICE NAME |
|---|---|---|
| 0 | 114(100G) | /sda |
| 1 | 115(500G) | /sdb |
| 2 | ←ADD(LV101) | |

| LUN | Zone#1 LV (CAPACITY) | DEVICE NAME |
|---|---|---|
| 0 | 100(100G) | /sda |
| 1 | dummy_LV_101 | /sdb |
| 2 | 110(900G) | /sdc |
| 3 | 111(500G) | /sdd |
| 4 | 112(900G) | /sde |

Fig. 7B

| LUN | Zone#2 LV (CAPACITY) | DEVICE NAME |
|---|---|---|
| 0 | 114(100G) | /sda |
| 1 | 115(500G) | /sdb |
| 2 | 101(800G) | /sdc |

| LUN | Zone#1 LV | DEVICE NAME |
|---|---|---|
| 0 | 100 | /sda |
| 1 | 101 | /sdb |
| 2 | 110 | /sdc |
| 3 | 111 | /sdd |
| 4 | 112 | /sde |

Fig. 11B

| LUN | Zone#1 LV | DEVICE NAME |
|---|---|---|
| 0 | 100 | /sda |
| 1 | 101←DELETE | /sdb |
| 2 | 110 | /sdc |
| 3 | 111 | /sdd |
| 4 | 112 | /sde |

Fig. 11C

| LUN | Zone#1 LV | DEVICE NAME |
|---|---|---|
| 0 | 100 | /sda |
| 1 | --- (DELETE) | /sdb ←ORIGINAL LUN2 |
| 2 | 110 | /sdc ←ORIGINAL LUN3 |
| 3 | 111 | /sdd ←ORIGINAL LUN4 |
| 4 | 112 | /sde |

DATA STORAGE DEVICE

CROSS-REFERENCE TO RELATED APPLICATION

This application is based upon and claims the benefit of priority of the prior Japanese Patent Application No. 2007-334548 filed on Dec. 26, 2007, the entire contents of which are incorporated herein by reference.

FIELD

A certain aspect of the embodiments discussed herein is related to a storage system.

BACKGROUND

When an operator assigns logical volumes in a storage system to servers, the operator performs assignment (i.e., mapping) of each of the logical volumes to one of the servers. The mapping is performed in accordance with the following procedure: firstly, zones, each of which is a group of gathered LUNs, are created so that the zones correspond to the servers, respectively; and secondly, the logical volumes are mapped to the LUNs, respectively, for every zone created, wherein the LUNs are pieces of identification information, each of which corresponds to a logical volume and allows the server to recognize the corresponding logical volume. By mapping between the LUNs and the logical volumes, respectively, in this manner, it is possible for each of the servers to access, via its own LUNs, respective logical volumes mapped to the LUNs.

A specific example will be hereinafter described with reference to FIG. 9 and FIG. 10.

Figure 9:
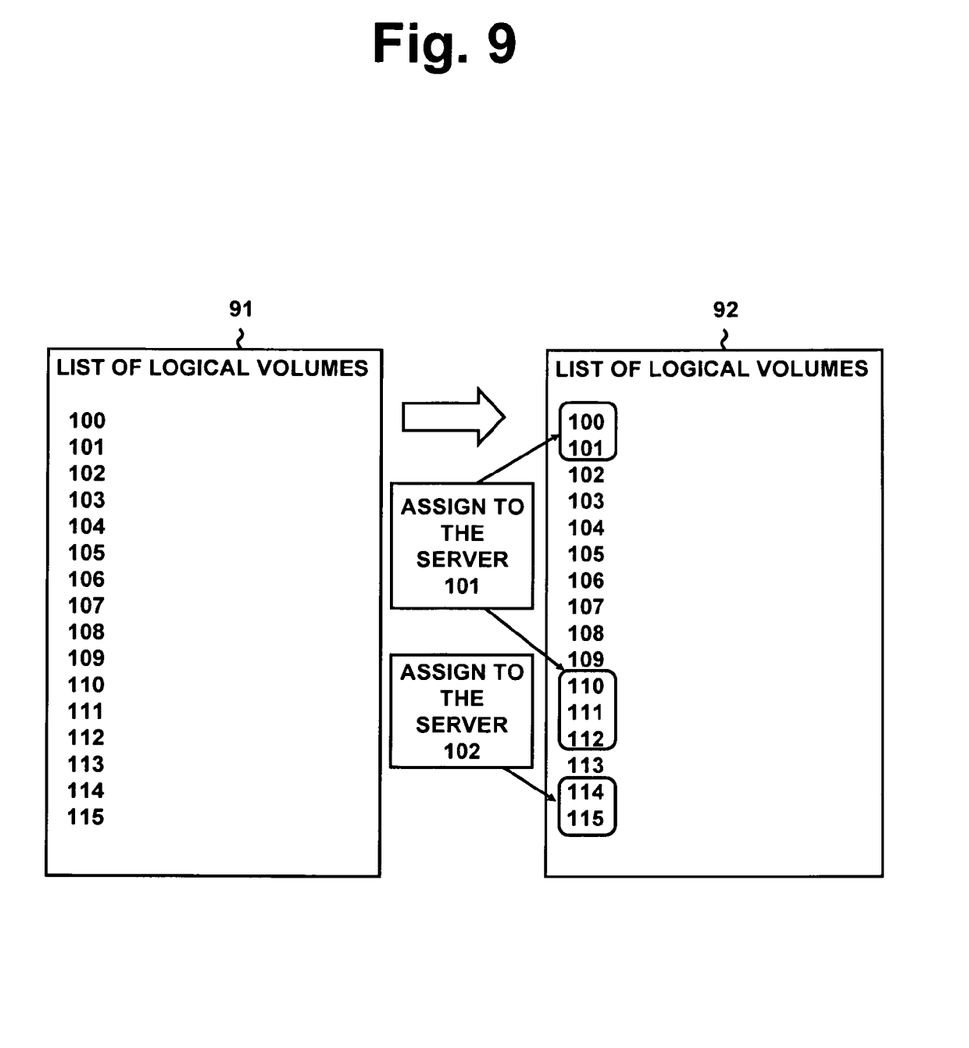
FIG. 9 is a diagram illustrating an example of a list of LVs and an assignment of LVs to servers in a storage system.
Figure 10:
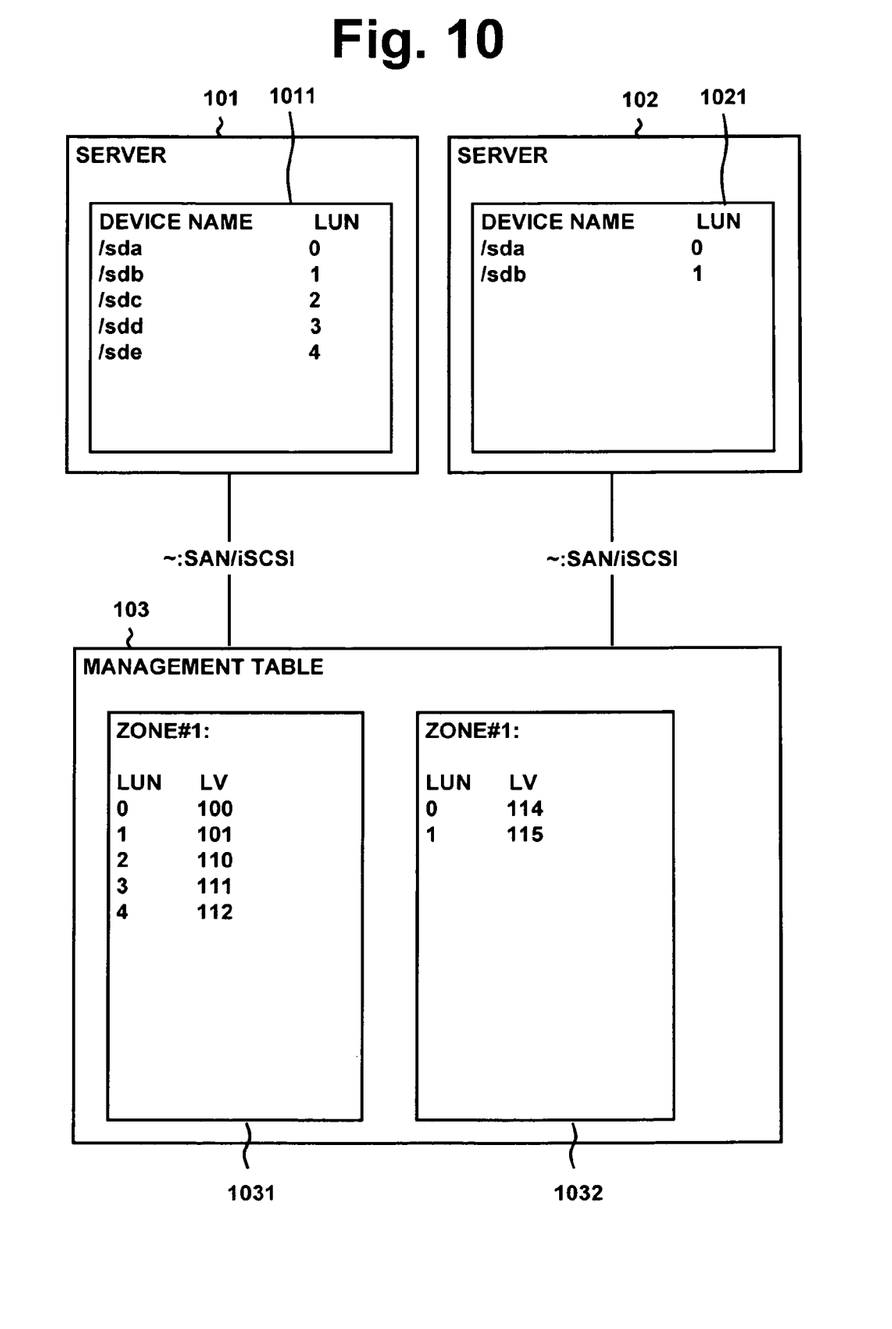
FIG. 10 is a diagram illustrating correspondence relations among Zones, LUNs and LVs of a storage system and device names of servers.

In FIG. 9, an example of a list of logical volumes managed in a storage system, which is configured to be connected with two servers (i.e., servers 101 and 102), is depicted. Let us denote, hereat, a piece of identification information associated with a logical volume corresponding to a numeric value "xyz" by "LV xyx". Moreover, let us assume, for example, that, in the storage system shown in FIG. 9, there are managed logical volumes corresponding to numerical values from 100 to 115, and further, there are LV 100, LV 101 and LV 110 to LV 112 to be assigned to the server 101, and LV 114 and LV 115 to be assigned to the server 102.

So that the servers 101 and 102 can recognize logical volumes assigned to themselves, it is necessary to perform mapping in the servers 101 and 102, respectively, between device names managed by the servers 101 and 102 and the logical volumes. In FIG. 10, respective correspondence relations ranging from the device names to the logical volumes are depicted. Firstly, in each of the servers 101, 102, correspondences 1011, 1021 between the device names and LUNs are managed in such a manner that, on recognition of a LUN, the server automatically creates a device name corresponding to the LUN; and secondly, in the storage system, correspondences between the LUNs and the LVs (i.e., pieces of identification information associated with the logical volumes) are managed. Moreover, Zone #1 and Zone #2 in the storage system correspond to the server 101 and the server 102, respectively.

Hereinafter, let us denote a LUN corresponding to a numerical value "a" by "LUN a". A management table 103 includes Zone #1 1031 and Zone #2 1032. Then, in Zone #1 1031 of the storage system, LUN 0 and LUN 1 correspond to LV 100 and LV 101, respectively. Similarly, LUN 2, LUN 3 and LUN 4 correspond to LV 110, LV 111 and LV 112, respectively. Further, in Zone #2 1032 of the storage system, LUN 0 and LUN 1 correspond to LV 114 and LV 115, respectively.

On the other hand, it is recognized by the server 101 that device names /sda and /sdb correspond to LUN 0 and LUN 1, respectively, and similarly, device names /sdc, /sdd and /sde correspond to LUN 2, LUN 3 and LUN 4, respectively. In addition, the LUNs of the server 101 correspond to those of Zone #1, respectively. In the case of the server 102, similarly, /sda and /sdb correspond to LUN 0 and LUN 1 of Zone #2, respectively.

In accordance with the correspondence relations described above, for example, when the server 101 accesses data stored in the logical volume LV 110, the server 101 can achieve this access via its own device name /sdc. In this manner, the server 101 can also access logical volumes LV 100 to LV 112 via its own device names /sda to /sde, respectively. Similarly, the server 102 can access logical volumes LV 114 and LV 115 via its own device names /sda and /sdb, respectively.

Further, a process of allowing a user to actually use logical volumes is as follows: firstly, starting-up (or rebooting) of each of the servers is performed by the user, or a dynamic recognition of correspondences between the device names and the LUNs is executed by each of the servers; and secondly, a predetermined command, given by the user, or automatically issued by the server, is executed by each of the servers, and thereby, the logical volumes are incorporated into a file system of each of the servers.

Moreover, in the related art, an information processing system, in which, in the fabric on a storage area network (SAN), in the case where a regular-volume is deleted, or a regular-volume and a sub-volume are interchanged, by providing a virtual server for volumes, it is possible to recognize anew a regular-volume after the interchange, is disclosed, for example, in Japanese Laid-Open Patent Application Publication No. 2007-102512. Further, a storage apparatus, in which, an exclusive process performed by an upper-level apparatus is made unnecessary, and further, it is possible to retain an exclusive control condition in the storage apparatus, is disclosed, for example, in Japanese Laid-Open Patent Application Publication No. 2001-249769.

However, once an alteration (i.e., a deletion of a piece of identification information associated with a logical volume) occurs in the mapping information under which a user accesses logical volumes, the correspondence relations in the mapping information are likely to be broken.

Figure 11A:
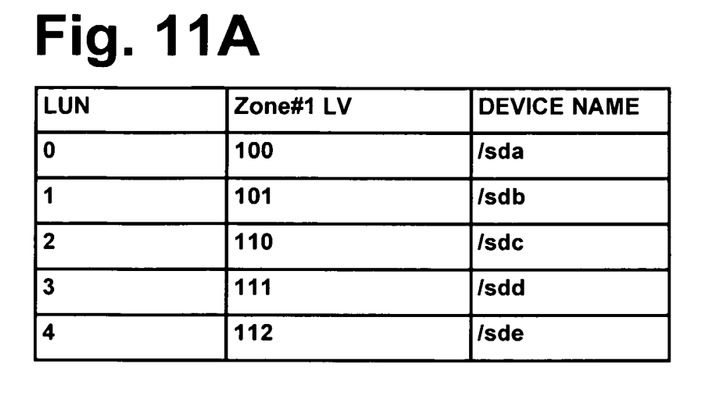
FIG. 11A to 11C are diagrams illustrating discrepancies in recognition of LVs subsequent to deletion of an LV.

For example, in the case where in-operation recognition of LUNs by the server 101 and correspondence relations between the LUNs and the logical volumes are as shown in a table of FIG. 11A, named as "Correspondence Relation at Commencement of Operation", let us assume a case where a user regards LV 101 as being unnecessary because of certain reasons, and tries to remove LV 101 from the target of operation. Then, operations performed by the user under this assumption are as described below.

Figure 11B:
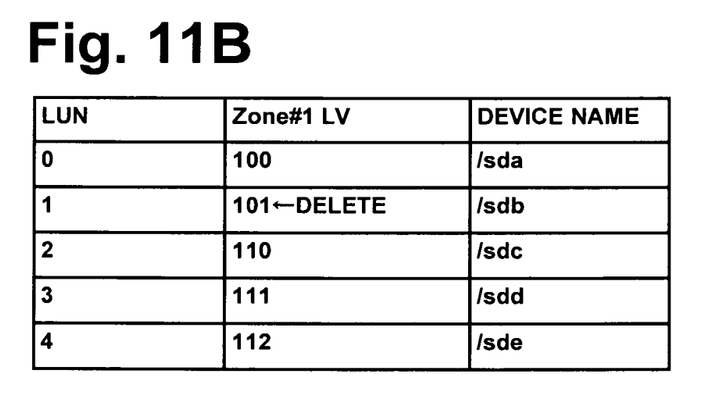

Firstly, the user removes /sdb from the file system by using a predetermined command or the like, and secondly, the user deletes LV 101 included in Zone #1. (Refer to a table of FIG. 11B, named "Deletion of LV 101")

Figure 11C:
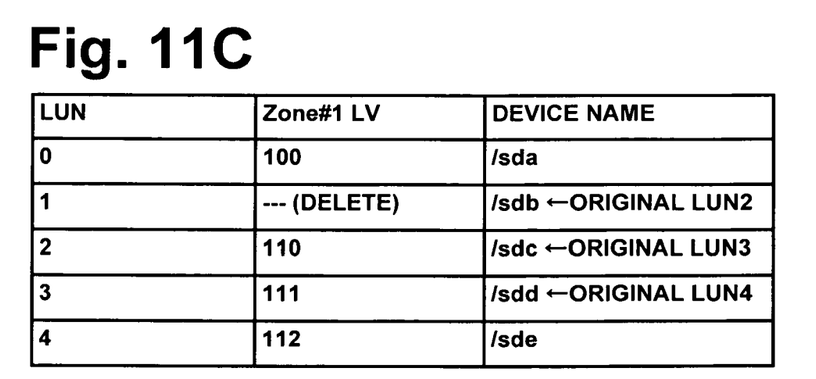

Moreover, once the restarting of the server 101 is performed by the user, or the dynamic rerecognition is executed by the server 101, subsequently, it results in discrepancies occurring in the correspondences between the device names and the LUNs due to the deletion of LV 101, as shown in a table of FIG. 11C, named "After Restarting or Dynamic Rerecognition". Under such a condition that discrepancies have occurred in the correspondence relations (i.e., under such a condition that discrepancies occur in recognition of LUNs), once a logical volume having any discrepancy in correspondences to a LUN is accessed, it will probably result in data stored in the logical volume accessed being destroyed.

Moreover, even if the user does not delete LV 101, which is now out of use, but leaves it in Zone #1 so as to prevent the discrepancies in recognition of LUNs by the server 101, it does not lead to effective utilization of a logical volume corresponding to LV 101 for other purposes, for example, a utilization by other servers, such as the server 102.

SUMMARY

According to an aspect of an embodiment, A storage device for storing data in accordance with a request from a server, the storage device includes: a memory for storing data in a plurality of logical volumes, the logical volumes being a plurality of areas assigned logically; a controller for controlling an access to data stored in the logical volume in accordance with a process comprising the steps of: generating mapping information indicative of a correspondence between logical volume information and recognition information, the logical volume information being indicative of the logical volumes in the storage unit, the recognition information being referred to by the server to recognize the logical volume; generating a pseudo logical volume and pseudo logical volume information associated with the pseudo logical volume, the pseudo logical volume being another of the logical volumes; and upon receipt of a command for canceling an assignment of one of the logical volumes to the corresponding recognition information, modifying the mapping information so that recognition information that has been indicative of said one of the logical volumes becomes indicative of the pseudo logical volume information associated with the pseudo logical volume.

The object and advantages of the invention will be realized and attained by means of the elements and combinations particularly pointed out in the claims.

It is to be understood that both the forgoing general description and the following detailed description are exemplary and explanatory and are not respective of the invention, as claimed.

DESCRIPTION OF EMBODIMENT

An embodiment according to the art will be hereinafter described with reference to the accompanying drawings.

Figure 1:
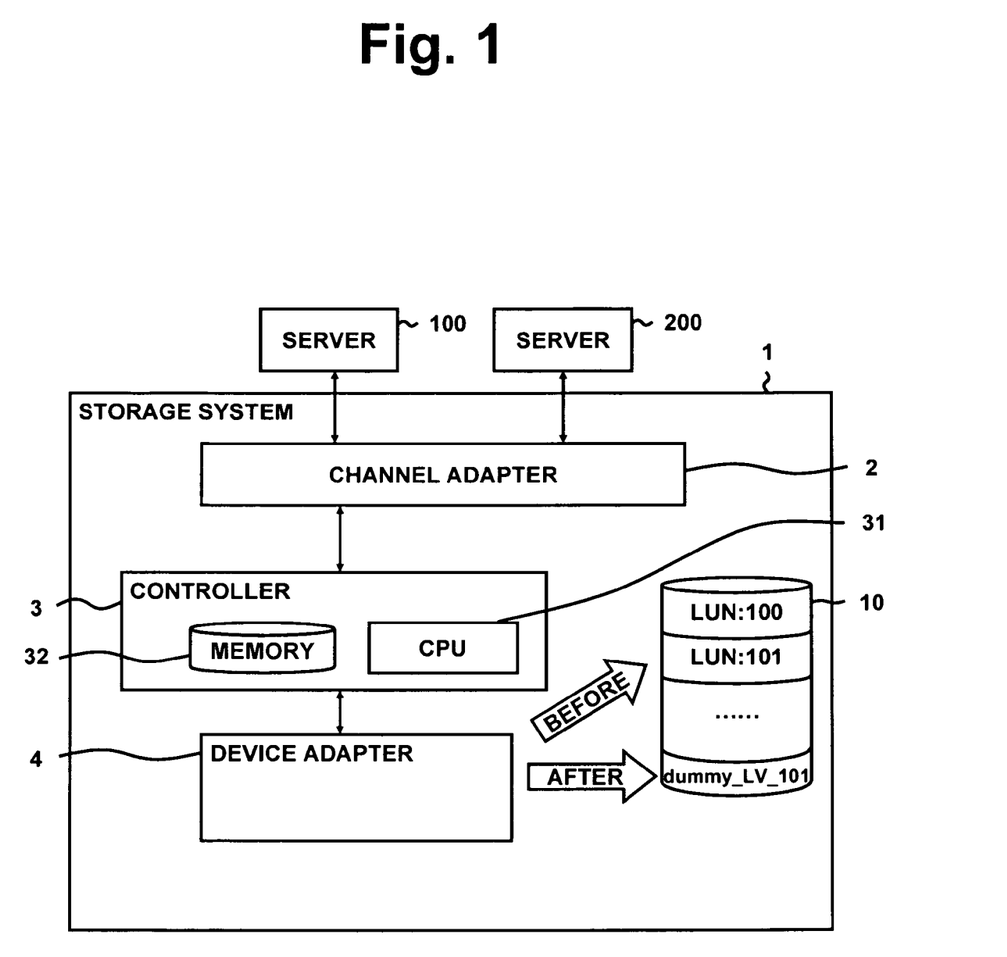
FIG. 1 is a block diagram illustrating an example of a configuration of a storage system according to an embodiment of the present invention.

FIG. 1 shows a configuration of a storage system according to an embodiment of the present invention. A storage system 1 according to the embodiment includes a channel adapter 2, a controller 3, (a controlling unit), a device adapter 4 and a device 10 (a storage unit).

The channel adapter 2 receives commands and data from servers 100 and 200, respectively, which are connected with the storage system 1 via iSCSI, respectively. Further, upon receipt of processing results and data from the controller 3, processed by the storage system 1 in response to the received commands, the channel adapter 2 transmits the resultants and the data to the servers 100 and 200, respectively. In addition, the servers 100 and 200 recognize the storage system 1 as their own external storage system, respectively. Further, the storage system 1 may be connected with the servers 100 and 200, respectively, using a standard other than iSCSI, such as Fibre Channel (FC).

The controller 3, which includes a CPU 31 and a memory device 32 composed of a nonvolatile memory device and a volatile memory device, performs processing in response to the commands obtained by the channel adapter 2, and then, transmits the resultants to the servers 100 and 200, respectively, via the channel adapter 2. Moreover, on the basis of management information which will be described below stored in the memory device 32 and the commands from the server 100 or the server 200, the controller 3 determines to which of logical volumes in the device 10 each of the commands is to be issued.

The device adapter 4, configured to provide connection between the controller 3 and the device 10, performs intermediation processing of the commands given to the device 10, and further, of accesses to data stored in the logical volumes of the device 10.

The device 10 includes a storage area partitioned into a plurality of logical volumes, and stores data in the partitioned logical volumes.

Figure 2A:
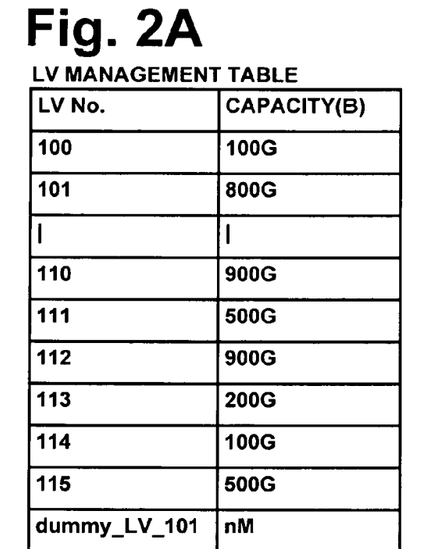
FIG. 2A is a diagram illustrating an example of an LV management table and FIGS. 2B and 2C are diagrams illustrating examples of a Zone management table according to an embodiment of the present invention.
Figure 2B:
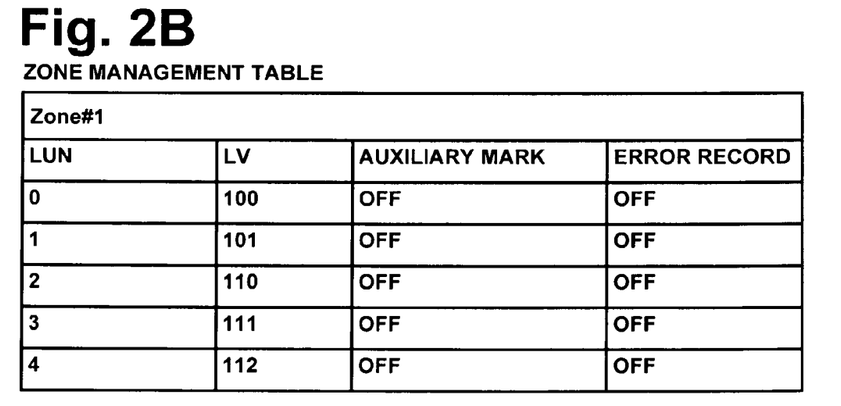
Figure 2C:
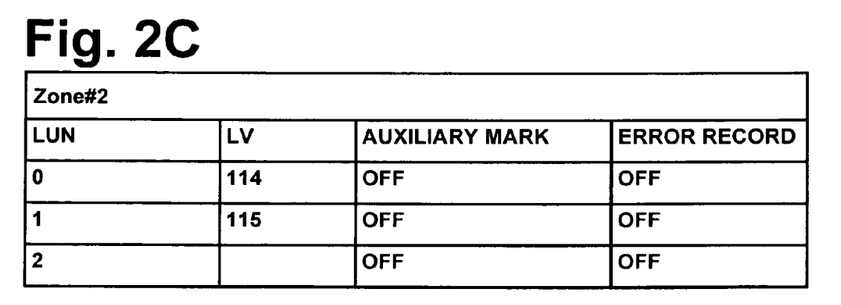

Hereinafter, a management method of logical volumes will be described with reference to FIGS. 2A to 2C. The logical volumes are managed on the basis of two kinds of management information stored in the memory device 32 of the controller 3, one being in a LV management table and the other one being in a Zone management table, as shown in FIGS. 2A to 2C.

Let us denote, hereat, a piece of identification information associated with a logical volume (i.e., a piece of logical-volume information) by "LV", and, as described above, a piece of identification information associated with a logical volume corresponding to a numerical value "xyz" by "LV xyx". Then, the LV management table is a list for representing respective correspondences between the LVs (i.e., pieces of logical-volume-associated information) and sizes of the logical volumes. Moreover, the Zone management table (having pieces of mapping information) is a list for representing, individually for each zone, respective correspondences between the LVs and the LUNs, i.e., pieces of identification information each of which has been made to correspond to a logical volume so that the servers 100 and 200 can recognize each of their own logical volumes, respectively. Further, two kinds of marks are added to each of the correspondences between the LVs and the LUNs, one being an auxiliary mark for representing whether the corresponding logical volume is a pseudo logical volume which will be described below, or not, the other one being an error record which will also be described below, wherein, in the case where the auxiliary mark is "ON", the corresponding logical volume is a pseudo logical volume; while, in the case where the auxiliary mark is "OFF", the corresponding logical volume is a normal logical volume.

Next, a summary of processing performed by the storage system 1 will be hereinafter described. In addition, in the embodiment according to the present invention, the processing is performed by causing the CPU 31 to execute relevant firmware stored in the memory device 32 (i.e., the processing is performed by the controller 3).

When an LV is deleted or removed by an operator for certain reasons, the LV is deleted from a relevant zone in the storage system 1 in accordance with operations performed by the operator. During this processing, upon receipt of a command for deleting a logical volume or a command for removing a logical volume corresponding to the LV, the controller 3 of the storage system 1 creates a new logical volume which will be hereinafter termed a pseudo logical volume and a LV associated with the pseudo logical volume which will be hereinafter termed a dummy LV, and further, alters the relevant content of the Zone management table so that a LUN corresponding to the logical volume targeted for deletion corresponds to the dummy LV. During this processing, further, a block of data of a predetermined size starting from a start address of the logical volume, which is taken out of operation and is now a target for deletion, is copied into the pseudo logical volume, wherein, in the block of data copied, a header part and a portion of user data whose start address is adjacent to an end address of the header part of the logical volume targeted for deletion are included so as to be inherited. In addition, the header part is a data area from a start address of a logical volume to an address resulting from addition of a number of a predetermined size to the start address of the logical volume, wherein the predetermined size is at most equal to or less than the size of the block of data copied, as described above.

As described above, the controller 3 performs mapping in the Zone management table so that the dummy LV can be substituted for the deleted LV, and thereby, in the storage system 1, it is possible to prevent discrepancies in recognition of LUNs by the server 100 which occur subsequent to the restarting of the server 100 or the dynamic rerecognition by the server 100.

Moreover, a summary of an operation performed by the storage system 1 in the case where the server 100 accesses a pseudo logical volume will be described below. In the case where the server 200 accesses a pseudo logical volume, an operation performed by the storage system 1 is same as or similar to the operation described below.

In the case where the server 100 accesses the pseudo logical volume by using a control command, the controller 3 obtains information associated with the dummy LV by referring to the content of the LV management table and the Zone management table, and then, sends back a normal response including the obtained information to the server 100.

In the case where the server 100 accesses a header part of the pseudo logical volume by using a Read command, the controller 3 sends back a normal response including a block of information stored in the header part of the pseudo logical volume, which was copied from the deleted logical volume, to the server 100.

In the case where the server 100 accesses data other than the data of a header part in the pseudo logical volume by using a first Read command, the controller 3 sends back an error response to the server 100, and turns on an error-record flag corresponding to the dummy LV in the Zone management table.

In the case where the server 100 accesses data other than the data of the header part in the pseudo logical volume by using a second Read command, the controller 3 confirms that the corresponding error-record flag is "ON", and then, sends back a normal response to the server 100 on the basis of data stored in the header part and the portion of user data. In addition, a reason why the normal response is sent back in response to the second Read command is that, in general, unless a normal response is sent back to a server, the starting up of the server is highly likely to be stagnant depending on a kind of OS used in the server.

In the case where the server 100 accesses a pseudo logical volume by using a Write command, the controller 3 sends back an error response to the server 100.

On the basis of the summary of the processing described above, further, details of the processing performed by the storage system 1 according to the embodiment of the present invention will be hereinafter described by way of a specific example.

Figure 3A:
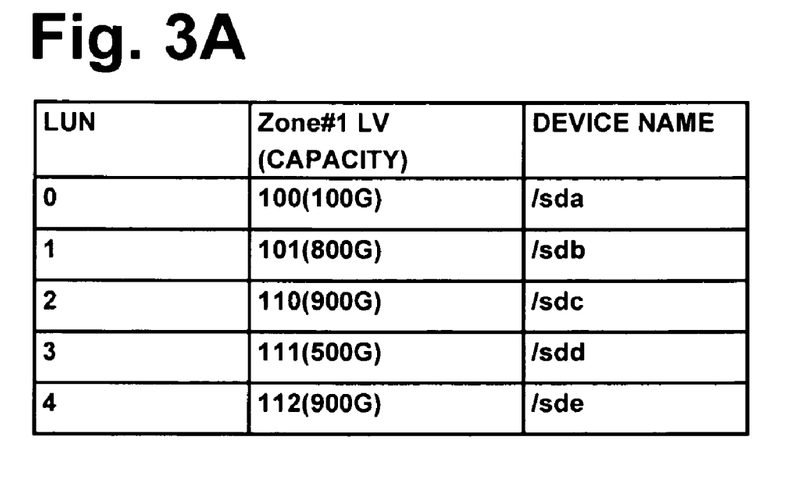
FIGS. 3A to 3C are diagrams illustrating correspondence relations between LUNs and LVs according to an embodiment of the present invention.
Figure 3B:
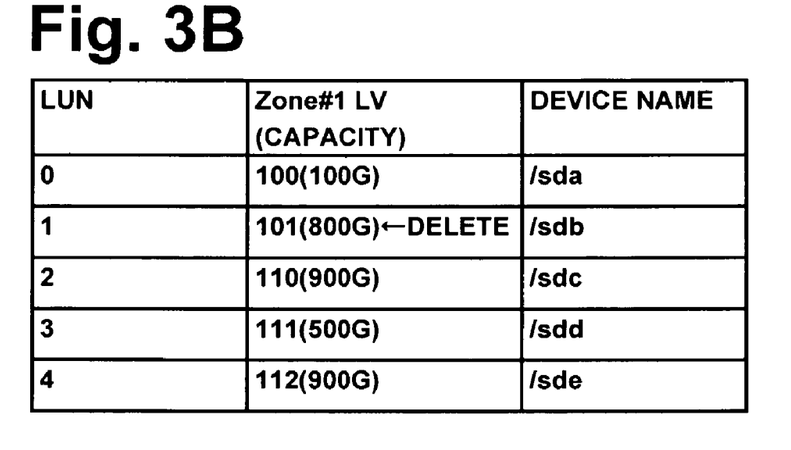
Figure 3C:
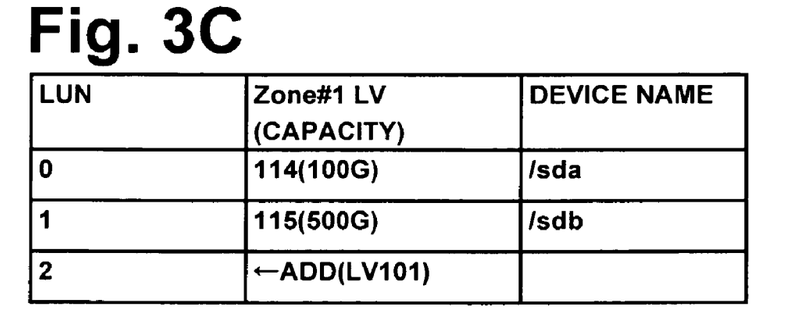

In FIG. 3A to 3C, a specific assumed example is represented. For example, in the case where correspondence relations between the LUNs and the LVs in the server 100 are as shown in a table of FIG. 3A, named "Pre-execution Correspondence Relation between LUN and LV associated with Server 100 (Zone #1)", it is assumed that, for certain reasons, a user desires to delete a logical volume corresponding to LV 101 which belongs to Zone #1, and to use the deleted logical volume as a logical volume which belongs to Zone #2. Refer to two tables of FIGS. 3B and 3C, named "Assumed Requirement". On the basis of this assumed example, the processing will be hereinafter described.

Hereat, a processing of deletion of LV 101 will be described with reference to a flowchart shown in FIG. 4. Hereinafter, it is assumed that commands are issued by the server 100.

In step S1, upon receipt of a command for deleting or removing a logical volume corresponding to LV 101, the controller 3 determines whether an LV corresponding to LUN 1 is registered in the Zone management table, or not. When the determination, in step S1, is "No", i.e., in the case where a certain LV corresponding to LUN 1 is not registered, the flow proceeds to step S10, where the controller 3 notifies the server 100 of an error response via the channel adapter 2, and then, the flow terminates.

When the determination, in step S1, is "Yes", i.e., in the case where a certain LV corresponding to LUN 1 is registered, the flow proceeds to step S2, where the controller 3 determines whether a certain LV corresponding to LUN 2, which is a LUN subsequent to LUN 1, i.e., a LUN with a suffix number incremented by "1", is registered, or not. When the determination, in step S2, is "No", i.e., in the case where a certain LV corresponding to LUN 2 is not registered, since it is obvious that LV 101 targeted for deletion is the last LV among the LVs registered in the Zone management table, even if the last LV among the LVs registered is deleted without further operations, no discrepancy in recognition of LUNs occurs. Thus, in the case where an LV targeted for deletion is the last LV among the LVs corresponding to the LUNs, the controller 3 deletes the LV, (i.e., LV 101) from the Zone management table without further operations, in step S11, and then, the flow terminates.

When the determination, in step S2, is "Yes", the flow proceeds to step S3, where, by referring to the content of the Zone management table, the controller 3 determines whether an auxiliary mark corresponding to the LV targeted for deletion is "OFF", or not. When the determination, in step S3, is "Yes", i.e., in the case where the auxiliary mark is "OFF", since the LV targeted for deletion is not a pseudo logical volume but a normal logical volume, the flow proceeds to step S4, where this deletion processing is subsequently performed.

In step S4, the controller 3 determines whether LUN 1 in the Zone management table corresponds to LV 101, or not, and when the determination is "No", i.e., in the case where LUN 1 does not correspond to LV 101, the controller 3 notifies the server 100 of an error response via the channel adapter 2, and then, the flow terminates.

When the determination, in step S4, is "Yes", i.e., in the case where LUN 1 corresponds to LV 101, the flow proceeds to step S5, and there, by using a surplus storage area in the device 10, which is not managed as any of logical volumes, the controller 3 creates a pseudo logical volume of a predetermined size (approximately 4 MB) and a dummy LV (a specific example of which is denoted by "dummy_LV_101"), which is a piece of identification information associated with the pseudo logical volume.

Moreover, the flow proceeds to step S6, and there, the controller 3 registers the dummy LV, created in step S5, into the LV management table. Subsequently, in step S7, the controller 3 copies a block of data of a predetermined size (approximately 4 MB) starting from a start address of the logical volume corresponding to LV 101 targeted for deletion into the created pseudo logical volume.

Figure 5:
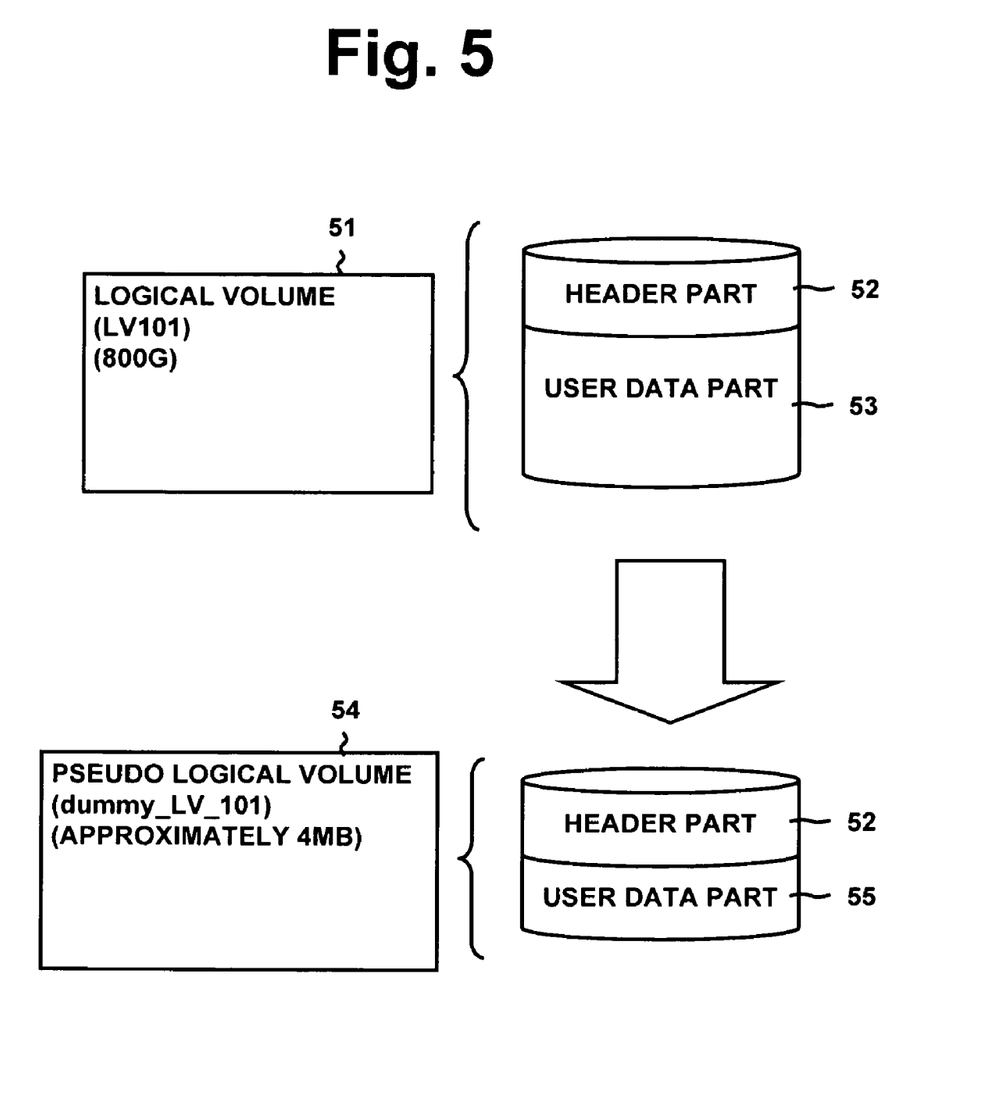
FIG. 5 is a diagram illustrating an example of a configuration of copied data, in the case where data of a normal logical volume (LV 101) is copied into a pseudo logical volume, according to an embodiment of the present invention.

Further, the process in step S7 will be described below with reference to FIG. 5. According to a prescribed specification condition with respect to an operating system (OS), if no prescribed management information is included in the header part 52, described above, which is a data area 53 from a start address of a logical volume 51 to an address resulting from addition of a number of a predetermined size to the start address of the logical volume, the server 100 cannot recognize the logical volume 51 as a normal logical volume. Further, according to another prescribed specification condition with respect to the OS, there is a possibility that a logical volume having no data other than the data of the header part 52, i.e., a logical volume having no user data, cannot be recognized as a normal logical volume by the server 100. Accordingly, in order to cause the server 100 to recognize the pseudo logical volume 54 as a normal logical volume, the controller 3 copies a block of data 55 of approximately 4 MB in size starting from a start address of the logical volume targeted for deletion into the pseudo logical volume 54 to be created.

Moreover, in the embodiment of the present invention described above, the size of the pseudo logical volume 54 to be created is specified to be approximately 4 MB so that the size of the pseudo logical volume 54 becomes smaller than a total size of the logical volume targeted for deletion; however, it should be noted that this specification is not meant to limit the embodiment of the present invention. In addition, it is desirable that the size of the pseudo logical volume 54 is as small as possible, and is at most smaller than the total size of the logical volume targeted for deletion.

Figure 4:
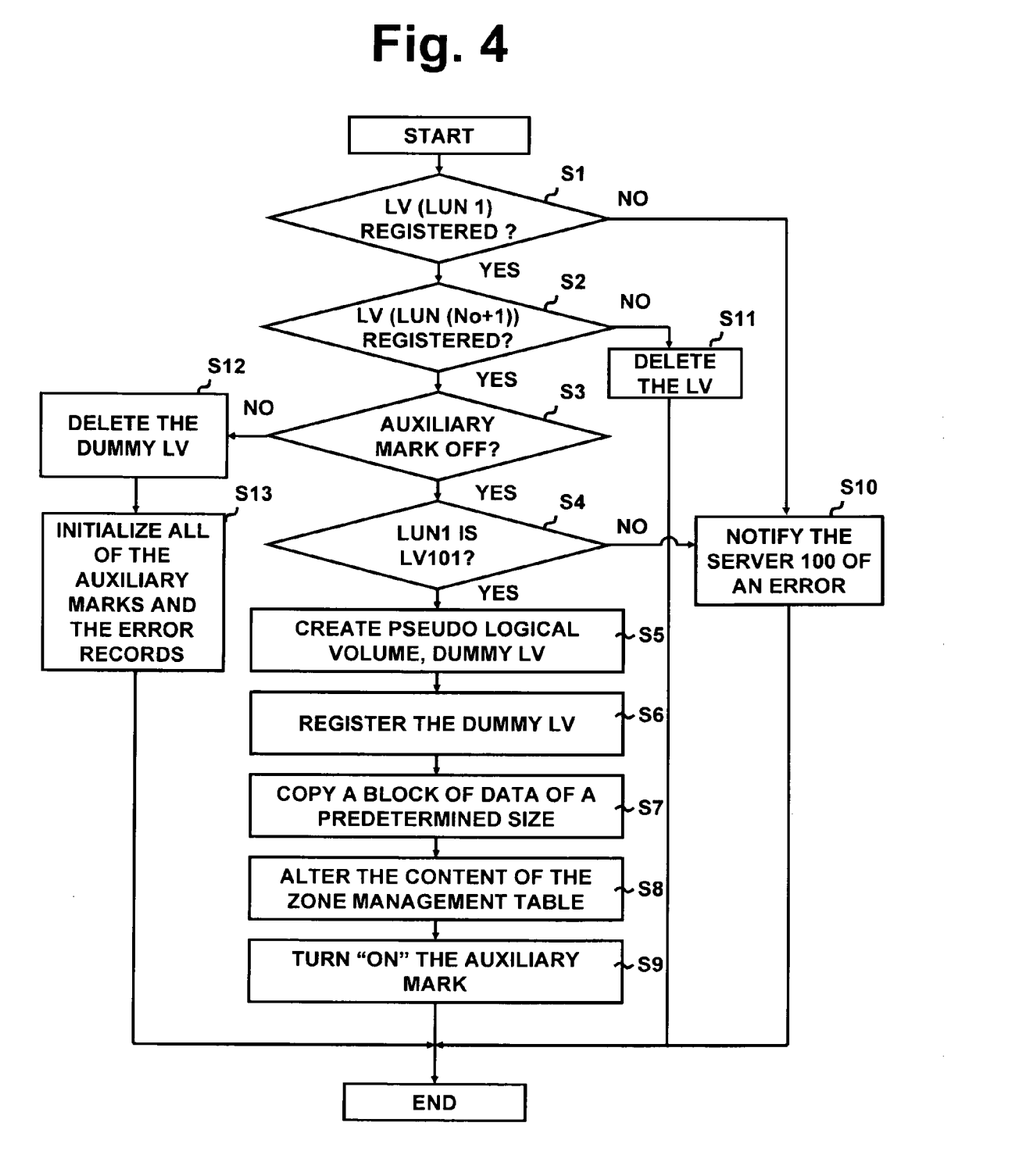
FIG. 4 is a flowchart illustrating an example of processing of deletion of an LV, according to an embodiment of the present invention.

Let us return, here, to the flowchart shown in FIG. 4. Subsequent to step S7, the flow proceeds to step S8, where the controller 3 alters the content of the Zone management table so as to exchange the LV targeted for deletion (i.e., LV 101) and the dummy LV (i.e., dummy_LV_101). Subsequently, in step S9, the controller 3 turns on an auxiliary mark corresponding to the dummy LV in the Zone management table.

Additionally, when the determination, in step S3, is "No", i.e., in the case where the auxiliary mark is "ON", the controller 3 regards it as being necessary to initialize all of the logical volumes in the device 10, and, in step S12, deletes the dummy LV corresponding to LUN 1 in the Zone management table, and further, in step S13, initializes (i.e., turns off) all of the auxiliary marks and the error records in the Zone management table.

Figure 6:
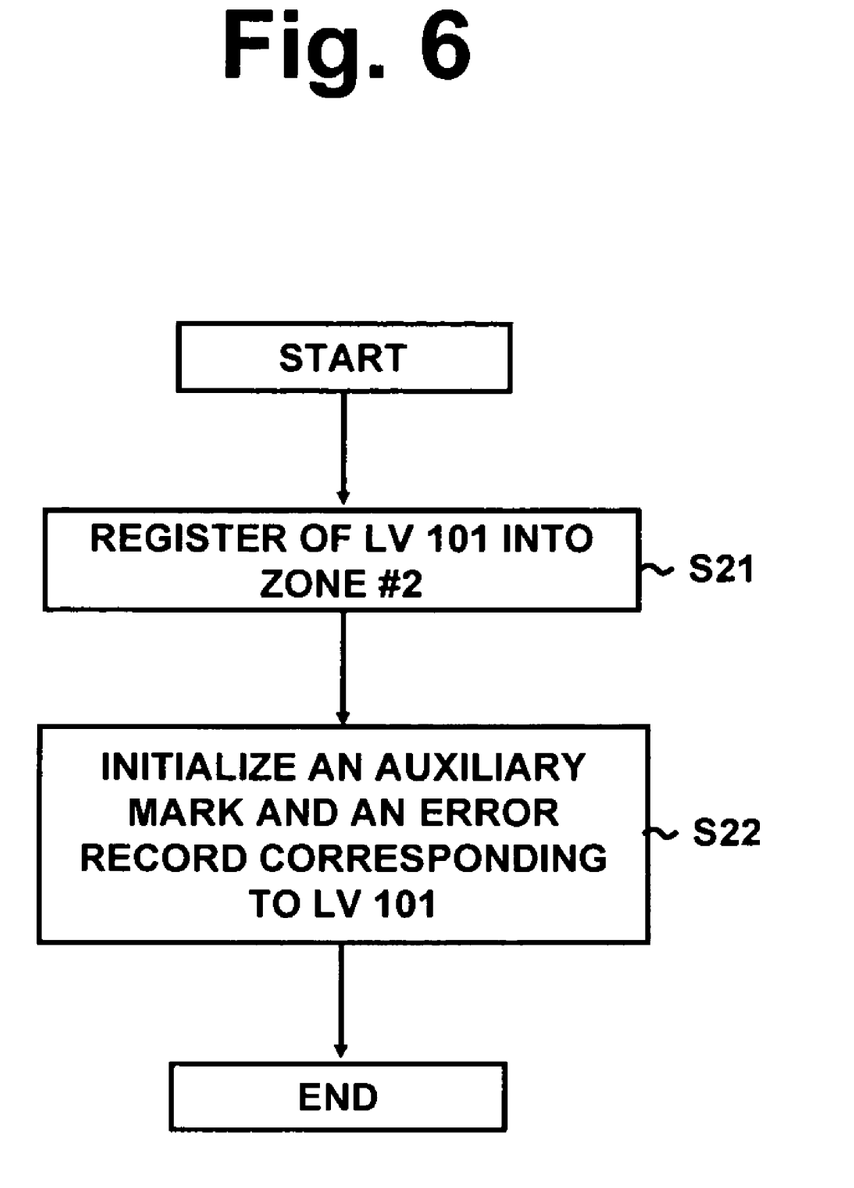
FIG. 6 is a flowchart illustrating an example of processing of registration of an LV, according to an embodiment of the present invention.

Next, a process of registration of LV 101 into the server 200, i.e., Zone #2, will be described with reference to a flowchart shown in FIG. 6. In addition, since the Zone management table is created in sequence by the proceeding of the process of registration, a process of creating the Zone management table is the same as or similar to the process of registration into the Zone management table.

In step S21, upon receipt of a command from a user, via the channel adapter 2, for the registration of LV 101 into Zone #2, the controller 3 registers LV 101 and LUN's number assigned with a serial number. Subsequently, in step S22, the controller 3 initializes (i.e., turns off) an auxiliary mark and an error record corresponding to LV 101.

Figure 7A:
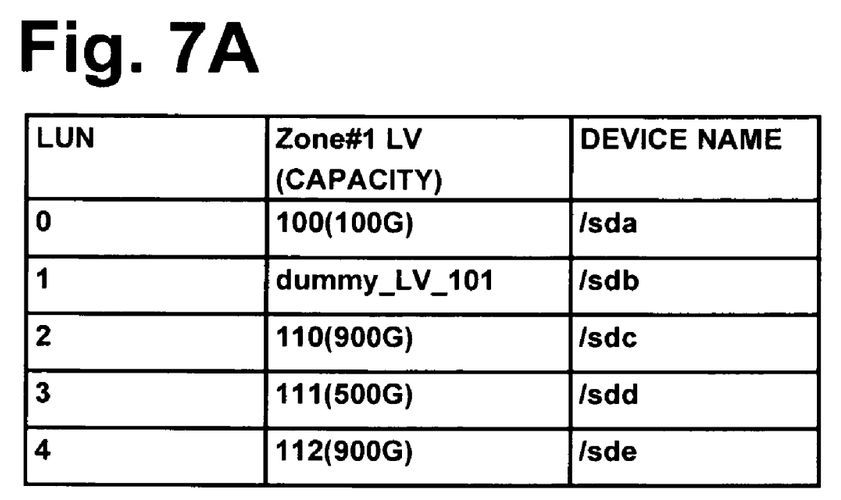
FIGS. 7A and 7B are diagrams illustrating correspondence relations between LUNs and LVs after processing of deletion, according to an embodiment of the present invention.
Figure 7B:
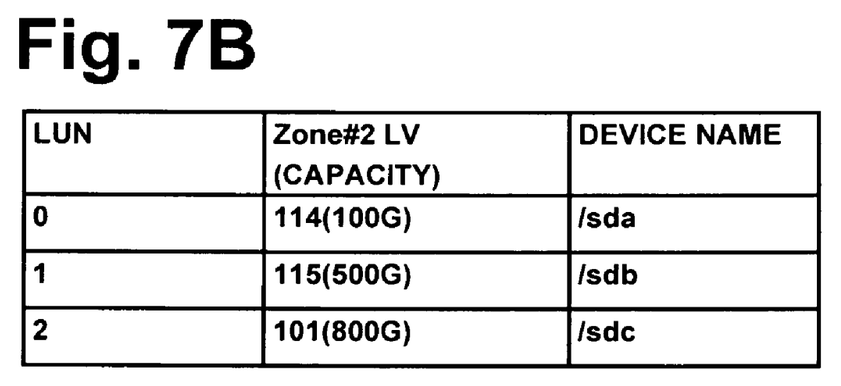

By performing the deletion and the registration process described above, the correspondence relations between the LUNs and the LVs shown in the table located in an upper portion of FIG. 3, named as "Pre-execution Correspondence Relation between LUN and LV associated with Server 100 (Zone #1)", are changed to those shown in the table in FIG. 7A and 7B. That is to say, in Zone #1, an LV denoted by the dummy_LV_101 corresponds to LUN 1, and is recognized as /sdb by the server 100, and further, in Zone #2, LV 101 corresponds to LUN 2, and is recognized as /sdc by the server 200. Accordingly, in such a manner as described above, even in the case where an LV is deleted, no discrepancy in recognition of LUNs by the server 100 occurs.

Figure 8:
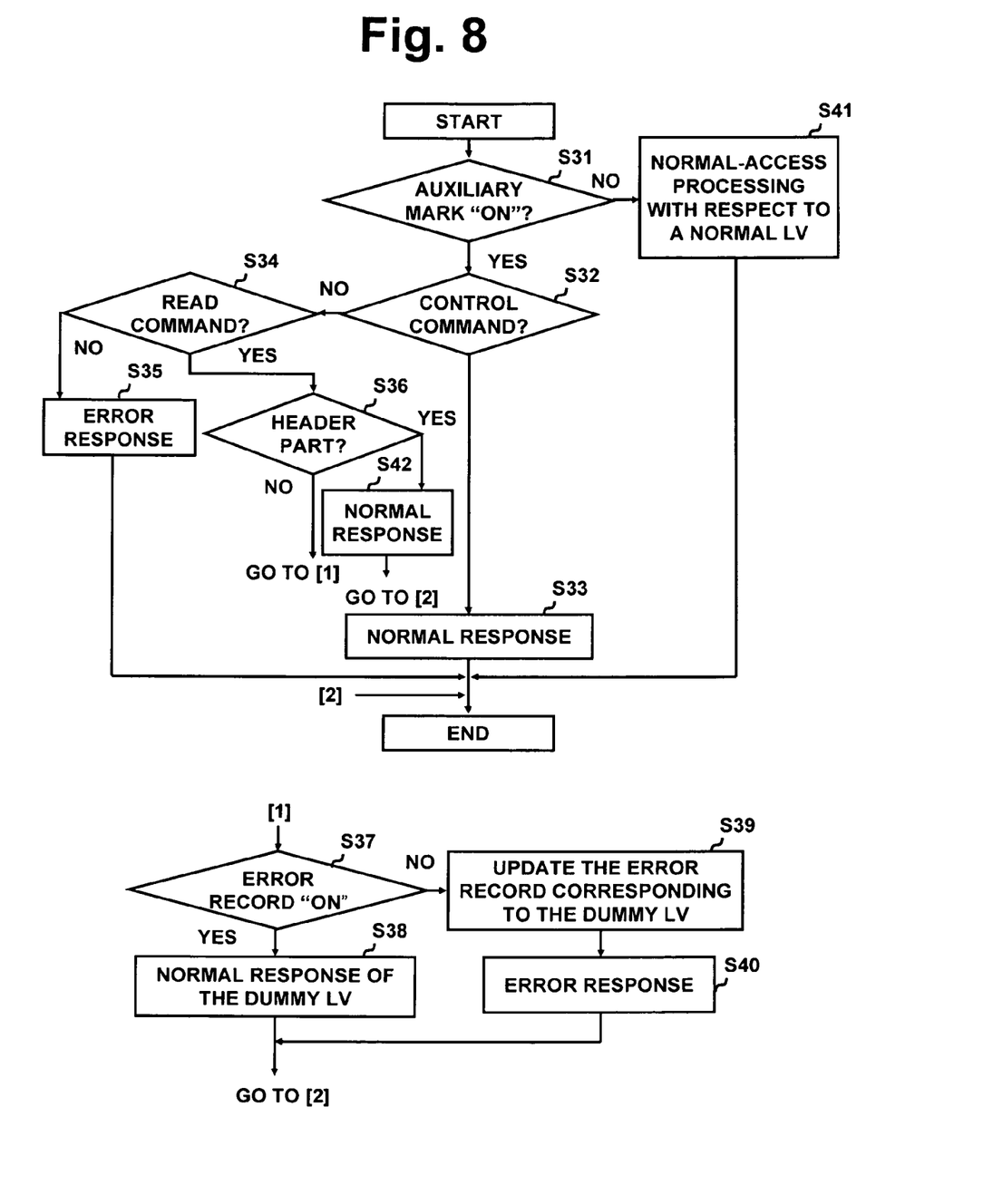
FIG. 8 is a flowchart illustrating an example of processing in response to a command from a server, according to an embodiment of the present invention.

Next, a process of an access from the server 100 to the pseudo logical volume, created in such a manner as described above, will be described with reference to a flowchart shown in FIG. 8. A process of an access from the server 200 to the pseudo logical volume is the same as or similar to the process of an access from the server 100.

In step S31, the controller 3 determines whether an auxiliary mark corresponding to a LUN which is a target of an access command from the server 100 is "ON", or not, on the basis of the content of the Zone management table. When the determination is "No", i.e., in the case where the auxiliary mark is "OFF", the flow proceeds to step S41, where the controller 3 performs normal-access processing with respect to a normal LV, and then, the flow terminates.

On the other hand, when the determination, in step S31, is "Yes", i.e., in the case where the auxiliary mark is "ON", the flow proceeds to step S532, where the controller 3 determines whether the received command is a control command, or not. When the determination is "Yes", i.e., in the case where the received command is a control command, the controller 3 obtains information associated with the pseudo logical volume from the Zone management table and the LV management table, and subsequently, in step 533, sends back a normal response including the information obtained from these tables to the server 100, and then, the flow terminates.

Moreover, when the determination, in step 532, is "No", i.e., the received command is not a control command, the flow proceeds to step 534, and there, the controller 3 determines whether the command is a Read command, or not. When the determination is "No", i.e., in the case where the command is not a Read command, since the received command is obviously a Write command, the controller 3 sends back an error response, and then, the flow terminates.

On the other hand, when the determination, in step 534, is "Yes", i.e., in the case where the received command is a Read command, the flow proceeds to step 536, where the controller 3 determines whether an address targeted for the access conforms to the address of the header part of the pseudo logical volume, or not. When the determination, in step 536, is "Yes", i.e., in the case where the address targeted for the access conforms to the header part of the pseudo logical volume, the flow proceeds to step S42, where controller 3 sends back a normal response to the server 100 including the block of data management information stored in the header part of the pseudo logical volume, and then, the flow terminates.

When the determination, in step S36, is "No", i.e., in the case where the address targeted for the access does not conform to the address of header part of the pseudo logical volume, the flow proceeds to step S37, where the controller 3 determines whether the error record corresponding to the dummy LV is "ON", or not, from the content of the Zone management table. When the determination, in step S37, is "No", i.e., in the case where the error record is not "ON", since this access is obviously an access using a first Read command, the flow proceeds to step S39, where the controller 3 updates the error record corresponding to the dummy LV in the Zone management table so that it becomes "ON", and subsequently, in step S40, sends back an error response to the server 100, and then, the flow terminates.

When the determination, in step S37, is "Yes", i.e., in the case where the error record is "ON", since this access is obviously a second or subsequent access from the server 100, the flow proceeds to step S38, where the controller 3 sends back a normal response on the basis of data stored in the header part and the portion of user data of the dummy LV, and then, the flow terminates.

The controller 3 according to the embodiment of the present invention is applicable as a storage system controlling apparatus having functions the same as or similar to those of the controller 3.

The storage system 1 according to the embodiment of the present invention can yield the following advantages.

In the storage system 1, by responding with the content of the dummy LV to an access from the server to the deleted logical volume, it is possible to prevent a problem of occurrence of a discrepancy in recognition of LUNs by the server.

Since a header part and a portion of user data are copied into the pseudo logical volume, and it is possible for the server to access the pseudo logical volume by using a Read command, it allows the storage system 1 to send back information included in the header part to the server, as described above; so that it is possible to fulfill the prescribed specification condition with respect to OS, and further, to eliminate differences among various types of products due to a heterogeneous environment.

By making a difference between the content of a response to a first access and the content of a response to a second or subsequent access, using a Read command from the server to the pseudo logical volume, it is possible to prevent the possibility, described above, of nonconformation of the specification condition with respect to the OS. Further, by rejecting a Write command from the server, it is possible to prevent tampering and destruction of data stored in the pseudo logical volume.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A storage device for storing data in accordance with a request from a server, the storage device comprising:
   a memory for storing data in a plurality of logical volumes, the logical volumes being a plurality of areas assigned logically;
   a controller for controlling an access to data stored in the logical volume in accordance with a process comprising the steps of:
      generating mapping information indicative of a correspondence between logical volume information and recognition information, the logical volume information being indicative of the logical volumes in the storage unit, the recognition information being referred to by the server to recognize the logical volume;
      generating a pseudo logical volume and pseudo logical volume information associated with the pseudo logical volume, the pseudo logical volume being another of the logical volumes; and
      upon receipt of a command for canceling an assignment of one of the logical volumes to the corresponding recognition information, modifying the mapping information so that recognition information that has been indicative of said one of the logical volumes becomes indicative of the pseudo logical volume information associated with the pseudo logical volume.

2. The storage device according to claim 1, wherein, when the mapping information has a plurality of the correspondences between the logical volume information and the recognition information, and the correspondence with respect to the target logical volume is located at a first or intermediate position of the plurality of the correspondences included in the mapping information, the controller modifies the mapping information so that the recognition information that has been indicative of said one of the logical volumes becomes indicative of the pseudo logical volume information associated with the pseudo logical volume.

3. The storage device according to claim 1, wherein the controller copies a block of data of a predetermined size starting from a start address of said one of the logical volumes into the pseudo logical volume, the start address being indicative of an address to start an access to data stored in said one of the logical volumes.

4. The storage device according to claim 1, wherein the controller sends back a response to the server in response to a command from the server to the pseudo logical volume.

5. The storage device according to claim 4, wherein the controller changes a content of the response in accordance with a destination of an access from the server to the pseudo logical volume.

6. The storage device according to claim 4, wherein the controller changes a content of the response in accordance with a content of an access from the server to the pseudo logical volume.

7. The storage device according to claim 1, wherein the controller generates the pseudo logical volume so that a size of the pseudo logical volume is significantly smaller than a size of said one of the logical volumes.

8. A controlling method for controlling a process of an access to data stored in a plurality of logical volumes of a storage device, comprising the steps of:
generating mapping information indicative of a correspondence between logical volume information and recognition information, the logical volume information being indicative of the logical volumes in the storage unit, the recognition information being referred to by the server to recognize the logical volume;
generating a pseudo logical volume and pseudo logical volume information associated with the pseudo logical volume, the pseudo logical volume being another of the logical volumes; and
upon receipt of a command for canceling an assignment of one of the logical volumes to the corresponding recognition information, modifying the mapping information so that recognition information that has been indicative of said one of the logical volumes becomes indicative of the pseudo logical volume information associated with the pseudo logical volume.

9. The controlling method according to claim 8, wherein, when the mapping information has a plurality of the correspondences between the logical volume information and the recognition information, and the correspondence with respect to the target logical volume is located at a first or intermediate position of the plurality of the correspondences included in the mapping information, the mapping information is modified so that the recognition information that has been indicative of said one of the logical volumes becomes indicative of the pseudo logical volume information associated with the pseudo logical volume.

10. The controlling method according to claim 8, wherein a block of data of a predetermined size starting from a start address of said one of the logical volumes is copied into the pseudo logical volume, the start address being indicative of an address to start an access to data stored in said one of the logical volumes.

11. The controlling method according to claim 8, further comprising the steps of:
sending back a response to the server in response to a command from the server to the pseudo logical volume.

12. The controlling method according to claim 11, wherein, a content of the response is changed in accordance with a destination of an access from the server to the pseudo logical volume.

13. The controlling method according to claim 11, wherein a content of the response is changed in accordance with a content of an access from the server to the pseudo logical volume.

14. The controlling method according to claim 8, wherein, during the mapping alteration step, the pseudo logical volume is generated so that a size of the pseudo logical volume is significantly smaller than a size of said one of the logical volumes.

* * * * *